United States Patent [19]

Schillaci

[11] Patent Number: 4,687,640
[45] Date of Patent: Aug. 18, 1987

[54] CHLORINE GAS FILTERING MATERIAL SUITABLE FOR USE IN A CHEMICAL OXYGEN GENERATOR

[75] Inventor: Samuel P. Schillaci, Tonawanda, N.Y.

[73] Assignee: Figgie International Inc., Willoughby, Ohio

[21] Appl. No.: 796,720

[22] Filed: Nov. 8, 1985

[51] Int. Cl.[4] .......................... B01D 23/00; A62B 7/00
[52] U.S. Cl. .................................. 422/120; 502/400; 422/126; 422/165; 55/387
[58] Field of Search ............... 422/120, 126, 164, 165; 502/400; 55/387, 71; 252/182

[56] References Cited

U.S. PATENT DOCUMENTS

| | | |
|---|---|---|
| 2,442,356 | 6/1948 | Gross . |
| 2,558,756 | 7/1951 | Jackson ............................. 422/164 |
| 3,536,070 | 10/1970 | Bovard et al. . |
| 3,542,522 | 11/1970 | Mausteller ......................... 422/126 |
| 3,756,785 | 9/1973 | Netteland . |
| 3,773,633 | 11/1973 | Teller . |
| 3,792,571 | 2/1974 | Waki et al. . |
| 3,868,225 | 2/1975 | Tidd ................................... 422/122 |
| 3,984,523 | 10/1976 | Schäfer et al. . |
| 4,201,751 | 5/1980 | Holter et al. . |
| 4,215,096 | 7/1980 | Sinha et al. . |
| 4,454,099 | 6/1984 | Moffat . |
| 4,472,363 | 9/1984 | Poller et al. . |

OTHER PUBLICATIONS

Lamb et al., The Removal of Carbon Monoxide from Air, Jan. 16, 1920, Contributions from the Chemical Warfare Service, U.S.A.
Cheylan, Manganese Carbonate Oxidation Catalysers, Jul. 1, 1944, Central Laboratory of The Chemical Services of the State.
Catalytic Processes on Non-Carbons, Chem Abstracts, vol's. 40 & 44, Nos. 10461 & 10981.
Carus Chemical Company—Advertising Material 1984.

Primary Examiner—David L. Lacey
Assistant Examiner—Lori-Ann Cody
Attorney, Agent, or Firm—Christel, Bean & Linihan

[57] ABSTRACT

A chlorine gas filtering material suitable for use in a high temperature oxygen environment, and a method of making the filtering material. The filtering material is prepared by impregnating a porous manganese dioxide and copper oxide hopcalite catalyst prepared by the carbonate method with sodium hydroxide. The process of making includes the steps of mixing the catalyst into a sodium hydroxide solution and then vacuum baking the impregnated catalyst for at least 8 hours, and preferably for 16 hours at a temperature of 240° F.–260° F.

6 Claims, 1 Drawing Figure

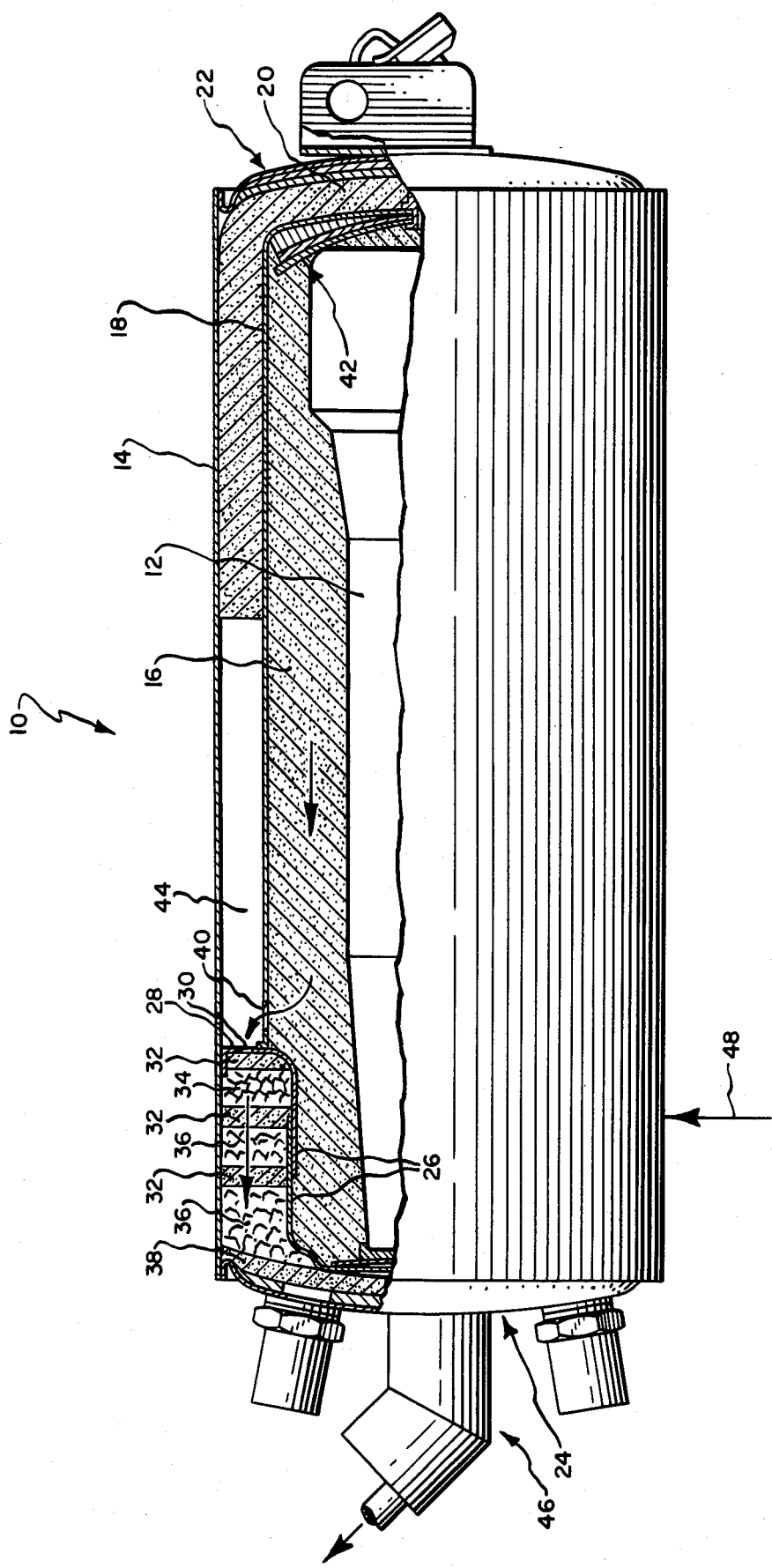

CHLORINE GAS FILTERING MATERIAL SUITABLE FOR USE IN A CHEMICAL OXYGEN GENERATOR

FIELD OF THE INVENTION

The present invention relates generally to a chlorine gas filtering material suitable for use in a chemical oxygen generator and to a method of making it, and more specifically to a filtering material suitable for use in a chemical oxygen generator of the type utilizing a chlorate candle and which is disposed within the shell of the generator and is capable of removing chlorine gas from the oxygen as it is being discharged, the filtering material being prepared by impregnating a porous manganese dioxide and copper oxide catalyst with sodium hydroxide.

BACKGROUND

Chemical oxygen generators are well known and are used for a variety of purposes, such as for example providing oxygen to the face masks stored within a housing located above each passenger and crew station in an aircraft as shown in U.S. Pat. No. 3,536,070. These chemical oxygen generators typically are provided with an oxygen liberating composition such as a chlorate or a perchlorate which generates oxygen when progressively decomposed after ignition, the oxygen generating composition being disposed within an insulated canister. The composition further may include a metal powder such as iron or carbon for burning and supplying part of the heat needed for combustion, a binder such as inorganic glass fibers for holding the mass together and aiding in the even decomposition of the chlorate or perchlorate, and a peroxide for chemically eliminating after start up the traces of chlorine gas released during thermal breakdown of the chlorate or perchlorate. These compositions are generally called chlorate candles, the candles being disposed within an insulated metal housing. In addition, as shown in U.S. Pat. No. 3,756,785 a chemical and mechanical filter is customarily provided at the discharge portion of the chemical oxygen generator for filtering out airborne particles, vapors and gases such as carbon monoxide. The filtering material typically includes hopcalite which is a well known specially prepared mixture of manganese dioxide and copper oxide in granular form which converts carbon monoxide into carbon dioxide. As most prior art chemical oxygen generators also discharge some free chlorine, the hopcalite also acts as a chlorine scrubber or getter. While hopcalite is an effective chlorine scrubber at relatively low volumes of air flow and low concentrations of chlorine, it is not effective at high flow rates and high concentrations. Also, normally hopcalite will outgas chlorine at high temperatures. With the development of a new series of chemical oxygen generators which exhibit higher oxygen flow than prior chemical oxygen generators, there is a requirement for a more effective chlorine getter. This is particularly true since the new series of chemical oxygen generators generate a large volume of chlorine in the range of 2000-3000 ppm during the first 30 seconds after activation.

It has been known in the past that activated carbon when coated with sodium hydroxide, as shown in U.S. Pat. No. 4,215,096 and granular pumice also when coated with sodium hydroxide, as shown in U.S. Pat. No. 2,442,356, serve as chlorine getters. However, while sodium hydroxide coated activated charcoal is a very efficient chlorine getter, activated charcoal is not suitable for use in an oxygen generator of the type referred to. Thus, when activated charcoal was tried in such a generator, the activated charcoal actually started to burn, causing a burn through in the stainless steel housing of the generator. The sodium hydroxide pumice was also tested and gave unacceptable test results. A hopcalite sold under the trade name of Carulite 200 by the Carus Corporation was also attempted to be coated by sodium hydroxide. However, when the Carulite 200 was added to the sodium hydroxide water solution rapid boiling occurred, and breakdown of the Carulite resulted. The consistency of the Carulite after being added to the sodium hydroxide solution was that of a sludge. It is believed that the Carulite 200 brand of the hopcalite is produced by the acid method. When used in this specification, acid method hopcalite is hopcalite produced generally by that method disclosed by Lucile S. Mathieu-Lévy in Ann. mines 138, 23-40 (1949), Chemical Abstracts 44, 4764f, wherein hopcalite-type catalysts is prepared from $MnSO_4$, $CuSO_4$, $H_2SO_4$ and $H_2O$. Also, is hopcalite produced generally by that method disclosed by Etienne Cheylan in Mém. services chim. état (Paris) 31, 299-303 (1944), Chemical Abstracts 40, 5986 wherein a hopcalite-type catalyst is prepared from Cu and Mn salts and an alk. carbonate, preferably $(NH_4)_2CO_3$.

OBJECTS OF THE INVENTION

It is an object of the present invention to provide an efficient chlorine gas getter for used in a chemical oxygen generator of the type referred to, the chlorine gas getter consisting of hopcalite prepared by the carbonate method, the hopcalite having a high surface area in the range of 100 $m^2/gm$, which material is impregnated with sodium hydroxide.

It is a further object of the present invention to provide a novel process for coating carbonate method hopcalite with sodium hydroxide.

The above objects and other objects of this invention will become more apparent after a consideration of the following detailed description taken in conjunction with the accompanying drawing.

BRIEF DESCRIPTION OF THE DRAWING

The FIGURE in the drawing is a partial cross section of a chemical oxygen generator utilizing the chlorine gas getter of this invention.

DETAILED DESCRIPTION

The filtering material of this invention is preferably made by initially baking out carbonate method hopcalite to drive off all water vapor and other volatile contaminants, by placing the baked out hopcalite in a solution of sodium hydroxide and distilled water, and subsequently vacuum baking the impregnated hopcalite.

The carbonate method hopcalite is initially baked out by placing the hopcalite in an appropriate sized bake out pan, the hopcalite being spread out in the pan to a level preferably not exceeding 1" in depth. The pan is then placed in an oven at a preferred temperature of 700° F.±10° F. The hopcalite is then allowed to bake out for a preferred length of time of from sixteen hours to eighteen hours. After the hopcalite has been baked out, it is allowed to cool down to room temperature.

The sodium hydroxide solution is prepared by adding sodium hydroxide to a suitable quantity of distilled water to make a solution of sodium hydroxide/distilled water in a preferred proportion of 0.15 kg/sodium hydroxide to 1 liter of water. While 0.15 kg of sodium hydroxide to 1 liter of water is preferred, concentrations as high as 0.25 kg/liter have given generally satisfactory results, and it is believed that a range of 0.1-0.3 kg/liter will give generally satisfactory results. The sodium hydroxide may be a commericial grade of pellets having a low carbonate level. The sodium hydroxide is added to the distilled water at such a rate as to maintain the solution temperature below 170° F. and to this end it may be necessary to cool the solution while the sodium hydroxide is being added. When all of the sodium hydroxide has gone into solution, the solution is then lowered to a temperature of preferably 70° F. or below. To the cooled sodium hydroxide/distilled water solution, the baked out hopcalite is then added (with mixing) in a preferred proportion of 1 kg hopcalite per liter of distilled water and at such a rate as to maintain the slurry temperature below 170° F. Once the full amount of hopcalite has been added to the solution, the slurry is then allowed to stand for preferably at least 30 minutes. After standing for 30 minutes or so, the excess sodium hydroxide solution is decanted.

The coated or impregnated hopcalite is now air dried until surface moisture is no longer visible. The air dried material is now sieved through a 10 mesh screen. Any large agglomerated particles which do not pass through the screen are broken up until they pass through the screen. The screened material is now preferably sieved through a 20 mesh screen and the fines which pass through the 20 mesh screen will not be used further. Thus, only the filter material which remains on the top of the 20 mesh screen is utilized further. The retained screened and air dried material is now loaded onto a bake out pan to a level preferably not exceeding 1" in depth. The pan is then placed in a vented oven preferably stabilized at 240° F.–260° F. and at ambient pressure and is held there for preferably 1 hour although a 2 hour bake out at ambient has also produced generally satisfactory results. After the bake out at ambient pressure, and with the temperature still being maintained at the preferred range of 240° F.–260° F., a vacuum is pulled preferably to at least 28" of mercury and the material is baked out for an additional 8-16 hours, although 16 hours is preferred until a moisture contact less than 2% is obtained preferably in the range of 1%-2%. After bake out the material is immediately placed into a sealed container from whence it can be loaded into suitable chemical oxygen generators at a later time.

The filter material of carbonate method hopcalite coated with sodium hydroxide in accordance with the above procedure have been tested against uncoated hopcalite and it has been determined that the new material outperforms untreated hopcalite in regards to chlorine filtering by a 3-4.5 margin. A bench test was performed with the hopcalite coated with sodium hydroxide in accordance with the above process and the results of the bench test are as follows:

| TEST # | BREAKTHROUGH TIME |
| --- | --- |
| 1 | 4 minutes, 37 seconds |
| 2 | 4 minutes, 12 seconds |
| 3 | 5 minutes, 17 seconds |
| 4 | 4 minutes, 16 seconds |
| 5 | 4 minutes, 49 seconds |
| 6 | 4 minutes, 33 seconds |
| 7 | 4 minutes, 25 seconds |

The untreated hopcalite used in the same test gave breakthrough times on the average of 1 minute. In these tests the chlorine flow was 2-3 times greater than the produced by the new chemical oxygen generators during the first 30 seconds of operation.

Bench tests were also conducted for pumice treated with various proportions of sodium hydroxide coated pumice. The following test results were obtained:

| TEST # | | BREAKTHROUGH TIME |
| --- | --- | --- |
| 1. 15 parts NaOH | 100 parts pumice | 3 seconds |
| 2. 10 parts NaOH | 100 parts pumice | 35 seconds |
| 3. 15 parts NaOH | 100 parts pumice | 5 seconds |
| 4. 20 parts NaOH | 100 parts pumice | 12 seconds |
| 5. 25 parts NaOH | 100 parts pumice | 20 seconds |

In view of the relatively rapid breakthrough times, pumice was not considered a suitable carrier for sodium hydroxide.

Additional bench tests were conducted utilizing activated charcoal as a chlorine scrubber. The bench tests gave an average breakthrough time of 13.45 minutes, which times are considered satisfactory.

In addition to the bench tests set forth above, functional tests were performed on the basis of the new chemical oxygen generator referred to above. A cross sectional view of a generator of the type referred to above is shown in the sole FIGURE of the drawing and is indicated generally at 10. The chemical oxygen generator 10 is provided with a central chemical core 12 in the form of a chlorate candle which, when ignited, will produce oxygen. The chlorate candle is disposed within a housing including a generally cylindrical stainless steel shell 14. Disposed between the core and the shell 14 are concentric layer of an insulation material 16, a sleeve 18 and a preformed insulation 20. At opposed ends of the stainless steel shell are ignition head and discharge head assemblies 22, 24, respectively, which are rigidly secured to the shell 14 in an airtight relationship to complete the housing. Disposed about the insulation 16 adjacent the discharge end of the chemical oxygen generator is a cylindrical bowl member 26 having a radially outwardly extending rim 28. An intermediate portion of the rim is disposed adjacent the sleeve 18 and that portion of the rim which extends radially outwardly from the sleeve 18 is provided with a plurality of apertures 30 for the passage of gases. Disposed between the bowl 26 and the stainless steel shell 14 are a series of stacked annular filters, and specifically particulate filters 32, an oxydizing catalyst 34 such as Carulite 200, and the chlorine getters 36 which consist of carbonate method hopcalite coated with sodium hydroxide. Finally, a further particulate filter 38 is provided adjacent the inner surface of the discharge head assembly and which contacts the bottom of the bowl 26 and one of the chlorine getters 36.

Once the core 12 is ignited, the gases which are produced will flow through the insulation material 16, and then through the holes 40 in the sleeve between the head assembly 42 and rim 28 then through the annular filters 32, 34, 32, 36, 32, 36 and finally through the filter 38 and discharge valve assembly 46, the flow of gases being indicated by the various arrows in the FIGURE.

As previously noted, when using activated charcoal as a chlorine getter in the new series of chemical oxygen generators, the charcoal became ignited and burn through of the stainless steel shell took place, the burn through occurring at the portion of the shell indicated at arrow 48. However, generators built up using 2 layers of the new filtering material of this invention at 36 completely removed all chlorine evolved. A generator in which the filter beds 34 and 36 were completely filled with untreated hopcalite has shown levels of chlorine leakage of up to 2-3 ppm.

Based upon the bench as well as the functional tests set forth above, it has been shown that the new filtering material does indeed absorb chlorine and that it absorbs the chlorine $3-4\frac{1}{2}$ times better than untreated hopcalite. It has also been shown that the filtering material produced by this process will have significantly low levels of carbon dioxide outgasing and also will not outgas chlorine at high temperature levels.

What is claimed is:

1. A chemical oxygen generator comprising:
a housing including a shell, an ignition head assembly and a discharge head assembly;
a chlorate candle core disposed within the shell; and filtering material disposed between the core and the shell, said filtering material including a chlorine getter consisting of a vacuum baked high surface area carbonate method hopcalite impregnated with a hydroxide selected from the group consisting of sodium hydroxide and potassium hydroxide.

2. The chemical oxygen generator as set forth in claim 1 further comprising a bowl and an apertured sleeve disposed within the shell in axial abutting relationship, insulating material disposed between the chlorate candle core and the bowl and sleeve, and wherein the filtering material is disposed between the bowl and the shell.

3. The chemical oxygen generator as set forth in claim 2 wherein the bowl is disposed adjacent the discharge head assembly.

4. The chemical oxygen generator as set forth in claim 1 wherein the filtering material further includes a particulate filter.

5. The chemical oxygen generator as set forth in claim 1 wherein the filtering material includes a series of stacked annular filters, said annular filters including particulate filters and chlorine getters.

6. An apparatus for the removal of chlorine from a gas which includes chlorine, said apparatus comprising a housing through which said gas may pass, and a chlorine getter disposed within said housing, said chlorine getter consisting essentially of vaccum baked high surface area carbonate method hopcalite impregnated with a hydroxide selected from the group consisting of sodium hydroxide and potassium hydroxide.

* * * * *